April 16, 1946. T. ZUSCHLAG 2,398,488
MAGNETIC ANALYSIS
Filed April 8, 1941
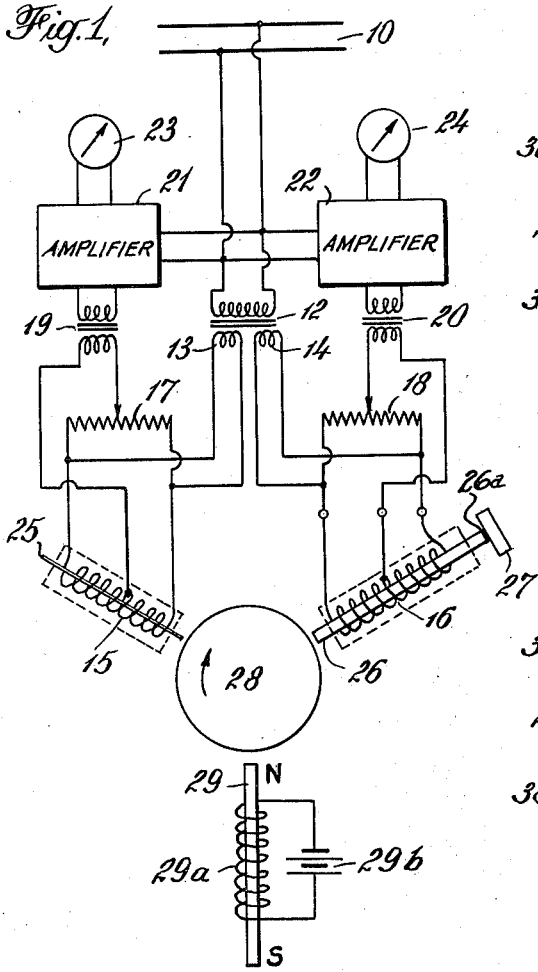
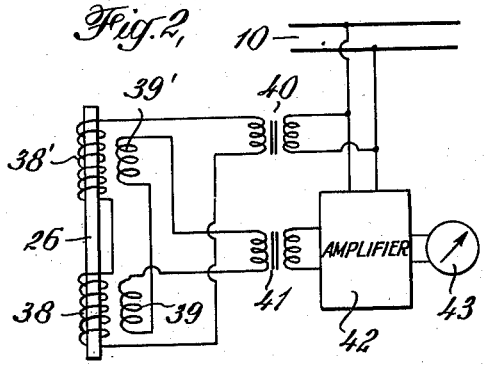
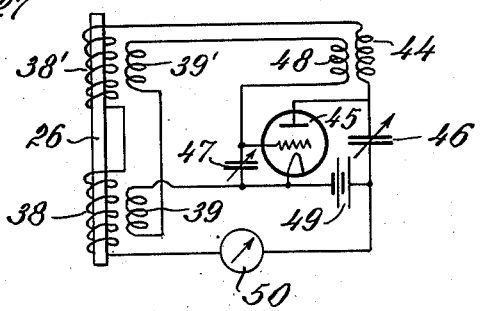
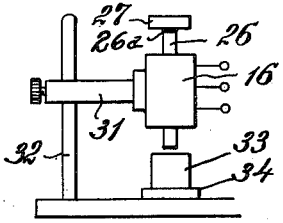
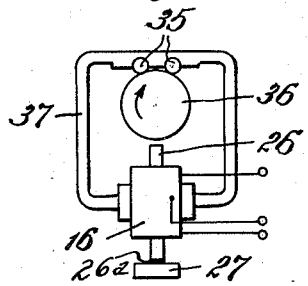
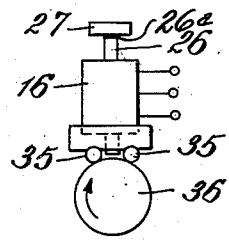
INVENTOR
Theodor Zuschlag
BY
Pennie, Davis, Marvin and Edmonds
ATTORNEYS Patented Apr. 16, 1946

2,398,488

UNITED STATES PATENT OFFICE 2,398,488

MAGNETIC ANALYSIS

Theodor Zuschlag, West Englewood, N. J., assignor to Magnetic Analysis Corporation, Long Island City, N. Y., a corporation of New York Application April 8, 1941, Serial No. 387,436

4 Claims. (Cl. 175—183)

This invention is concerned with magnetic analysis and particularly with testing ferromagnetic objects by magnetic means to determine variations in dimensions or metallurgical characteristics or both. In its preferred form, the apparatus of my invention may be employed for simultaneously determining dimensional variations and the existence of flaws in steel and the like. The apparatus is capable of detecting and differentiating between deep-seated flaws and those which affect the surface characteristics of the objects.

I have discovered that variations in dimensions of ferromagnetic specimens and in the surface characteristics of such specimens may be detected and measured with great accuracy by means of a ferromagnetic core energized by an alternating electromagnetic field with one end of the core disposed adjacent a ferromagnetic end piece but separated therefrom by a small non-magnetic gap of constant dimensions, and the other end of the core disposed adjacent the ferromagnetic specimen to be tested but separated therefrom by a small non-magnetic gap which varies with dimensional variations in the specimens being tested. The apparatus is also provided with means for determining changes in flux in the end portion of the core adjacent the specimen. These changes in flux are indicative of variations in the dimensions or surface characteristics or both of specimens undergoing test.

For the determination of deep-seated flaws and other defects in magnetizable specimens, I have found that the core should be of magnetic material capable of becoming saturated at relatively low flux densities as compared with iron and the like. Such a core need not be provided with the ferromagnetic end piece described hereinbefore but should be made of a magnetic material that is easily saturated such, for example, as a nickel-chromium alloy, particularly "Nichrome." The core is disposed with one end in magnetic relationship with a ferromagnetic specimen to be tested, but is separated therefrom by a small non-magnetic gap (which is preferably but not necessarily constant in dimensions). Means are provided for creating a unidirectional magnetic field in the specimen, for creating an alternating electromagnetic field in the core, and for determining changes in flux in the end portion of the core adjacent the specimen. These changes in flux are indicative of deep-seated variations in the structure of the specimen undergoing test.

It will be apparent that the present invention may be employed in the testing of any magnetic or magnetizable material, and that the term "ferromagnetic" is used broadly in the specification and claims to mean any magnetic material whether or not it contains iron.

In the preferred form of my apparatus both types of cores and their appurtenant equipment are provided so that variations in both external and internal characteristics of the specimens undergoing tests can be determined simultaneously.

These and other features of my invention will be more thoroughly understood in the light of the following detailed description taken in conjunction with the accompanying drawing in which:

Fig. 1 is a wiring diagram of a preferred type of the apparatus of my invention provided with two test cores and means for creating a unidirectional magnetic field in the specimen undergoing test;

Fig. 2 illustrates an alternative circuit arrangement which may be employed with either of the two types of cores of my invention;

Fig. 3 is a further alternative circuit which can be employed with either type of core;

Fig. 4 is an elevation of a means for holding the first type of core in appropriate relationship to a specimen being tested, for example, for variations in thickness;

Fig. 5 is an elevation of a type of core-holding device of my invention particularly adapted for use in determination of dimensional variations in cylindrical bar stock or the like; and Fig. 6 illustrates another type of core-holding device of my invention particularly adapted for holding a core in fixed magnetic relationship to a sample of bar stock or the like being tested for major variations in shape or dimension, or for slight variations in surface characteristics. The apparatus of Fig. 6 is particularly adapted for use in the detection of flaws as manifested by slight surface variations.

Referring to Fig. 1, it will be observed that an alternating-current supply 10, which may be a conventional 110 volt, 60 cycle source, is connected to the input side of a step-down transformer 12 provided with a pair of substantially identical secondary coils 13, 14. These secondary coils are connected respectively to two symmetrical bridge networks each provided with center-tapped energizing coils 15, 16 shunted respectively by potentiometers 17, 18. Each of these coils is wound in two portions and these portions are arranged and connected in series aiding relation, as shown. The taps of the respective pairs of energizing coils and the sliders of the potentiometers are connected in bridge relationship across the primaries of two signal transformers 19, 20 respectively. The secondaries of the signal transformers are connected respectively through amplifier combinations 21, 22 to meters 23, 24.

The taps or sliders of the potentiometers are adjustable for initial balancing of the bridge circuits. The two bridges are substantially identical in all respects except as to the nature of the cores in the center-tapped energizing coils.

The energizing coils 15, 16 may be of any appropriate dimensions. Conveniently they are about 3″ long and 1½″ in diameter, and consist of several hundred turns of insulated wire of low ohmic resistance. As shown in the drawing, they are preferably wound in two equal consecutive portions positioned coaxially on an open magnetic core.

The multi-layered energizing coil 15 is provided with a magnetic core 25 which preferably is a single substantially straight piece of "Nichrome" wire of about #22 gauge slightly longer than the coil. The core should be of small diameter (preferably less than about one-tenth of a centimeter) in order that the flux densities in the core will be sufficient to approach the saturation point of the material of which the core is made.

Core material that is capable of being saturated at relatively low flux densities as compared with iron is much to be preferred. Alloys of nickel and chromium are, in general, suitable. Thus, an alloy containing about 60 to 80% nickel, 10 to 20% chromium, and 0 to 25% iron and capable of becoming saturated at relatively low flux densities is preferable. "Nichrome" is an example of a commercial alloy which may be employed.

One end, viz., the "adjacent" end, of the core 25 is disposed adjacent a magnetizable specimen 28 to be tested. The axis of the core is perpendicular to that of the specimen, so that the other end of the open core is magnetically remote from the specimen. By "magnetically remote" is meant that the other or remote end of the core is effectively spaced sufficiently far away from the specimen so that in operation the magnetic influence of variations in the specimen on the end of the core remote from the specimen is substantially less than the influence on the adjacent end. In Fig. 1, the specimen is represented as a piece of cylindrical steel bar stock. The core 25 is supported so that the end adjacent the specimen is adapted to be "spiraled" past the core by means of rollers (not shown) or other known supporting means for the specimen or material under test. To accomplish this the specimen is rotated in a clockwise direction (as indicated by the arrow) while also being moved longitudinally.

Disposed immediately below the specimen as shown in Fig. 1 is a magnet 29 which has its axis transverse to that of the specimen. This magnet creates a unidirectional non-fluctuating magnetic field in the specimen. The magnet may be a permanent magnet or may be an electromagnet provided with a solenoid 29a energized by direct current source 29b. The reliability of the analysis often may be increased by demagnetizing the specimen before testing it, for instance, in the manner described in my United States Patent No. 2,207,392. If the specimen 28 under test is of thin-wall material such as tubing, the magnet 29 should be placed inside to oppose the core 25 so that the procedure previously described may be followed. In this event variations in thickness of the wall will be indicated.

Other means for creating a unidirectional magnetic field (i. e., a field such as that produced by non-fluctuating direct current) in the specimen undergoing test may be employed. For example, a direct current may be passed through the section of the specimen undergoing test from brushes in contact therewith, or other forms of direct current electromagnets may be employed and disposed at other angular relationships to the specimen.

For regulating the flux in cores 25 and 26 during initial adjustment of the apparatus, means such as rheostats may be employed. Although such regulation of the alternating current in the energizing coils is seldom necessary, it is advisable to provide for moving magnet 29 with respect to the specimen, or for varying the current in solenoid 29a if magnet 29 is an electromagnet, in order to adjust the field for maximum sensitivity of the testing core and coil arrangement.

The other energizing coil 16 of the apparatus of Fig. 1 is provided with a ferromagnetic core 26 which conveniently is a piece of quarter inch diameter substantially straight iron rod slightly longer than the winding of this coil. Such a core has a relatively large cross section, as compared with that of the core 25 used in exploring for deep-seated flaws, etc., and is capable of being saturated only at flux densities higher than those required in the case of the core 25. However, if desired this core 26 may also be made of "Nichrome" or the like provided it has a relatively large cross-section. The core 26 is disposed perpendicularly to the axis of the specimen undergoing test. The end of the core adjacent the specimen, viz., the "adjacent" end, is separated from the specimen by a small air gap which varies during the rotation of the specimen in accordance with dimensional variations in the specimen. Thus, if the specimen is supported on rollers, the gap between the specimen and the end of the core will change as the diameter or contour of the perimeter of the specimen changes. The gap between the core and the specimen preferably is very small, for example, only a few thousandths of an inch.

The other or remote end of the open core 26 is magnetically remote from the specimen, viz., is spaced sufficiently far away from the specimen so that in operation the magnetic influence of variations in the specimen on the remote end of the core is substantially less than the influence on the adjacent end of the core. This remote end is provided with a ferromagnetic end piece or "counterweight," such as a disk of iron 27, disposed in any suitable manner with a constant non-magnetic gap 26a of suitable dimension between it and the end of core 26. The cross-section of the end-piece should be the same as, or larger than, that of the material under test. The end piece may be supported in such relation to core 26 by means of supports independent of the core, or it may be fastened to the end of the core by means of small bolts or screws of non-magnetic material and separated from the core as by small non-magnetic washers, leaving a constant gap of air except for the space occupied by bolt and washer by which the dimension of the gap can be adjusted. Alternatively a suitable thickness of insulating cloth may be interposed between the core and the end piece. From the foregoing it will be clear that the dimension of the air gap and the size of the end-piece together comprise two variables with which the magnetic effect on the core due to the material under test may be counterbalanced by that of the end-piece—hence the term "counterweight." If the specimen 28 is supported from below on rollers (not shown) and is rotated and simultaneously advanced longitudinally, the air gap between the magnet 29 and the specimen will remain substantially constant, while the air gaps between the specimen and the two cores will vary with changes in cross-section of this specimen.

In the operation of the apparatus of Fig. 1, the bridge associated with the core 26 is balanced with a specimen 28 of standard dimension in the apparatus. The air gap between the specimen and the end of the core 26 should be fairly small, because the sensitivity of the apparatus increases markedly with a decrease in this air gap. By keeping the air gap small and employing high amplification, the meter 24 will register reliably variations in the air gap as low as one ten thousandth of an inch. The gap 26a between the other end of the core and the counterweight should also be small.

In the preferred form of my apparatus, the size of the gap 26a between the counterweight and the core is adjustable. The bridge associated with the core 26 is balanced roughly by adjusting this gap with a standard test specimen of known and desirable dimension placed in the apparatus. It is desirable to adjust this gap so that leakage flux linking only one side of center-tapped energizing coil 16 encounters a flux path whose reluctance is about the same as that encountered by leakage flux linking only the other side of coil 16, i. e., so that about equal voltages appear across each half of the coil. Thereafter, the standard specimen is replaced by a specimen to be investigated. Any variations between the dimensions of the standard specimen and of the specimen being tested will unbalance the bridge, causing current to flow in transformer 20 and indicating the variation at once on the meter 24.

The bridge associated with the other test coil 15 is brought into a balanced condition by adjusting the slider on the potentiometer 17 while subjecting a standard specimen 28 to the field of the magnet 29. The standard with respect to which the adjustment of this bridge is made should be one which is free of flaws and otherwise desirable from a metallurgical standpoint. Thereafter, if flaws exist in a specimen which has replaced the standard, there will be distortions in the magnetic fields, causing a change in the reactance of the half of energizing coil 15 near the specimen and an indication on the meter 23.

It will be apparent that it is unnecessary to employ both types of cores in a single test apparatus. However, it is frequently desirable to do so, because the core 25 is sensitive to deep-seated flaws and relatively insensitive to changes in dimensions or in surface characteristics of the specimen, while the core 26 is relatively insensitive to deep-seated flaws but highly sensitive to changes in cross-sectional dimensions of the specimen being tested, and also to changes in surface characteristics. Certain types of defects in steel samples, for example cracks, are manifested by a slight change in the smoothness of the surface of the bar. Sometimes cracks may be discovered by exploring the surface of the bars with finger tips, but this procedure is neither safe nor reliable. However, in the apparatus of my invention, particularly with an energizing coil equipped with a core 26 having a magnetically balanced end-piece or "counterweight," minute changes in smoothness of the bar surface are detected reliably. When both types of cores are used simultaneously, certain defects which may be missed by one indicating system will be indicated by the other.

Referring now to Fig. 4, it will be observed that, in this instance, the core 26 is mounted on a bracket 31, the height of which is adjustable on a standard or upright 32 extending upwardly from a base. The base carries a support 34 of non-magnetic material, for example, copper, brass, or Bakelite, upon which a ferromagnetic specimen 33 to be tested is disposed. This specimen may be a thin piece of ferrous metal foil, which is carried over the support so that the gap between the end of the core 26 and the foil varies with changes in the thickness of the foil. There is no contact between the core and the foil. The core 26 is provided with the energizing coil 16, non-magnetic gap 26a, and end piece 27, and is connected in the circuit as shown in Fig. 1.

In summary, the apparatus in Fig. 1 and Fig. 4 comprises a rigidly supported ferromagnetic core, coil means for creating an alternating electromagnetic field in the core, a ferromagnetic end piece disposed adjacent one end of the core and separated therefrom by a small non-magnetic gap of constant dimensions during test on material of given dimensions, non-magnetic means for supporting in sequence a succession of generally similar ferromagnetic specimens, or contiguous sections of the same specimen, adjacent the opposite and magnetically remote end of the core in magnetic relationship therewith but separated therefrom by a small non-magnetic gap (usually an air gap) which varies with the dimensional variations of the specimens, and means for determining changes (due to dimensional variations of the specimens) in the flux linking the portion of the coil means near the end of the core adjacent the specimen.

When round material is tested, it is preferable to employ the apparatus shown in Fig. 5. In this apparatus a plurality of steel balls 35, riding on a cylindrical specimen 36 being tested, support a framework 37 on the underside of which is fastened the detecting coil 16 with its core 26 and counterweight 27. After adjustment of the air gap between the bar 36 and the core 26 any change in the diameter of the bar will be immediately indicated by the meter 24 connected in the bridge network.

The apparatus of Fig. 5, like that of Fig. 4, is adapted to be employed in conjunction with either type of test coil, and may be employed with the bridges as shown in Fig. 1.

Ordinarily, it is more important to detect the presence of flaws in bar stock and the like than it is to detect changes in dimensions. Hence, in testing cylindrical bar stock for the presence of flaws which are manifested by changes in the superficial characteristics of the bar, it is preferable to employ the apparatus of Fig. 6. In this apparatus, the energizing coil 16 is mounted upon balls 35 or rollers so that the gap between the specimen 36 and the end of the core 26 is substantially unaffected by minor changes in the diameter of the bar. In these circumstances, the apparatus becomes sensitive primarily to the changes in the smoothness of the bar surface adjacent the end of the core, although, of course, very large variations in diameter or shape of the test specimen will change the gap.

The apparatus of Fig. 6 is particularly suitable for use as a portable unit for the detection of cracks or other defects in cylindrical bar stock, which defects are characterized by superficial irregularities. For this purpose it is important that the gap between core and specimen be kept constant except for such superficial irregularities, and changes in the gap due to changes in diameter are undesirable in this use of testing core 26. It may be noted that the supporting arrangements illustrated in Figs. 1, 5 and 6 may be adapted for use with non-cylindrical stock of any generally uniform cross-section, or for the inspection of parts such as races. In this case the specimen cannot be rotated, and is merely displaced longitudinally.

The supporting means of Fig. 6 (like the supporting means of Figs. 4 and 5) may also be employed with the core 25 and its appurtenant apparatus for the detection of deep-seated flaws. The apparatus of Fig. 6 is desirable for such use because it tends to minimize the variations in the air gap between the end of the core and the specimen. Although the core 25 is not particularly sensitive to changes in air gap, it will be preferable to keep these at a minimum.

Instead of the bridge arrangements illustrated in Fig. 1, other testing circuits, such as those illustrated in Figs. 2 and 3, may be employed. In the apparatus illustrated in these figures, instead of measuring changes in the voltages across two halves 38, 38' of the coil carrying the energizing alternating current, additional pick-up coils 39, 39' are placed in inductive relationship with each half of the energizing coil, and the voltages induced in these pick-up coils are measured. Changes in the flux linking one end portion only of the core will cause changes in the voltage induced in the pick-up coil near that end of the core.

In the particular arrangement illustrated by Fig. 2, the energizing coil is separated into two halves 38, 38' wound on core 26, and the center tap is omitted. The pick-up coils 39, 39' of like construction are connected so that the voltages induced in them buck each other, i. e., the coils are connected in series opposition, the relation of the coil assembly thus being symmetrical. When using a core 26 having an end-piece and a fixed gap (26a) adjusted for magnetic balance as described above, the two voltages will tend to cancel each other completely, and a change in the flux linking the pick-up coil nearest the specimen being tested will cause a relatively great change in the voltage induced across the two coils. This voltage is impressed on the primary of a signal transformer 41, causing corresponding currents to appear in the secondary of the signal transformer. These currents are fed to an amplifier 42, and the resulting variations may be observed on an output meter 43 associated therewith. The coils 39, 39' may be constructed in any manner so as to be inductively coupled to the corresponding sections 38, 38' of the energizing coil, and may suitably be concentric with these sections. As a source of the alternating electro-magnetic field in the core, the energizing coil may be connected to the secondary of a power transformer 40 similar to one side of the transformer 12 of Fig. 1 and itself energized from the line 10.

A similar coil arrangement is illustrated in Fig. 3, in which, however, an electronic oscillator is used as a source of alternating current for the energizing coils 38, 38'. To accomplish this result, a vacuum tube 45 is employed with a source of plate power 49 and filament supply (not shown). The plate circuit contains a tuned circuit comprising a variable condenser 46 shunted by a plate inductance 44 in series with the energizing coils 38, 38' and a meter 50. The grid circuit contains a variable condenser 47 shunted by a feed-back coil 48, coupled to the coil 44 and in series with the pick-up coils 39, 39'. Oscillations in plate current passing through the energizing coil 38, 38' are set up in known manner due to feed-back from the inductance 44 to the coil 48. The pick-up coils 39, 39' may conveniently be wired in series opposition so that ordinarily only a small voltage appears across the two coils in series due to the resulting condition of balance, but changes in the flux near one end of core 26 will not only change the reactance of the coils and thus upset the balance, but will also cause relatively great changes in the voltage appearing across the two pick-up coils. This voltage, being in series with the feed-back voltage appearing across coil 48, causes changes in the oscillations. Meter 50 will measure these changes and thus indicate the original changes in the flux caused by variations in the specimen.

It should be observed that the core 25 (Fig. 1) may be employed in place of the core 26 in the apparatus of Figs. 2 and 3, and that the circuits of these figures may be employed in pairs (with both types of core) as illustrated in Fig. 1.

Ordinarily energizing coils 38 and 38' of Figs. 2 and 3 are connected in series-aiding relationship, but they may also be connected in series-opposing relationship. In either event the polarity of coils 39 and 39' should be opposite to that of coils 38 and 38', respectively, so that if coils 38 and 38' are aiding, coils 39, 39' should be opposing, and vice versa.

It will be apparent that marking relays, and indicators of various types may be employed in place of the current meters 23, 24, 43, 50.

The apparatus of my invention, and particularly that form in which both types 25, 26 of cores are employed, is especially suited for production testing and permits more rapid and more reliable inspection than has been possible heretofore. Moreover, more information can be obtained with respect to the material tested, since it is possible not only to inspect in one operation for both flaws and dimensional variations, but also to differentiate between different types of flaws.

I claim:

1. In magnetic analysis apparatus the combination which comprises a single substantially straight ferromagnetic open core having an adjacent end and a remote end, coil means wound on said core, an energizing circuit including said coil means and a source of alternating current for creating an alternating electromagnetic field in said core, means for disposing a ferromagnetic specimen to be analyzed adjacent said adjacent end only of said core in magnetic relation thereto but separated therefrom by a small non-magnetic gap, said remote end of said core being spaced sufficiently far from said specimen so that in operation the magnetic influence of variations in said specimen is substantially less on said remote end than on said adjacent end, a ferromagnetic end piece disposed adjacent said remote end only of said open core and proportioned approximately to magnetically balance the magnetic effect of said specimen on said core, said end piece being separated from said core by a small non-magnetic gap, said coil means including a plurality of coil portions spaced apart on said core, and an electric indicating circuit effectively connected to said coil means to indicate electric unbalance of the voltages in said coil portions.

2. In magnetic analysis apparatus, the combination which comprises, a substantially straight ferromagnetic open core having an adjacent end and a remote end, an energizing circuit including coil means comprising a plurality of coil portions symmetrically spaced along said core, and a source of alternating current for creating an alternating electromagnetic field in said core, means for movably disposing a ferromagnetic specimen to be analyzed adjacent said adjacent end only of said core in magnetic relation thereto but separated therefrom by a small non-magnetic gap, said remote end of said core being spaced sufficiently far from said specimen so that in operation the magnetic influence of variations in said specimen is substantially less on said remote end than on said adjacent end, a ferromagnetic end piece disposed adjacent said remote end only of said open core and proportioned approximately to magnetically balance the magnetic effect of said specimen on said core, said end piece being separated from said core by a small non-magnetic gap, and an electric balancing and indicating circuit including said coil portions, adjustable means connected to said coil means for balancing the voltages in said coil portions, and indicating means effectively connected to said last named circuit for indicating the condition of balance thereof.

3. In magnetic analysis apparatus, the combination which comprises a substantially straight ferromagnetic open core having an adjacent end and a remote end, means for disposing a ferromagnetic specimen to be analyzed adjacent said adjacent end only of said core in magnetic relation thereto but separated therefrom by a small non-magnetic gap, said remote end of said core being spaced sufficiently far from said specimen so that in operation the magnetic influence of variations in said specimen is substantially less on said remote end than on said adjacent end, a ferromagnetic end piece disposed adjacent the other end only of said open core and proportioned approximately to magnetically balance the magnetic effect of said specimen on said core, said end piece being separated from said core by a small non-magnetic gap, a source of alternating current, a coil wound in two equal consecutive portions positioned coaxially along said open core, means connecting said coil portions in series aiding to said source of alternating current whereby to create an alternating electromagnetic field in said core, an electric balancing circuit including said coil, impedance means connected across the ends of said coil, and indicating means effectively connected between an intermediate point on said impedance means and a point on said coil intermediate the ends thereof to form a bridge circuit, said impedance means being adjustable to permit balancing said bridge circuit.

4. In magnetic analysis apparatus, the combination which comprises, a substantially straight ferromagnetic open core having two ends, means for disposing a ferromagnetic specimen to be analyzed adjacent one end only of said core in magnetic relation thereo, but separated therefrom by a small non-magnetic gap, and for disposing said specimen remote from the other end only of said core, a ferromagnetic end piece disposed adjacent the remote end only of said open core and proportioned approximately to magnetically balance the magnetic effect of said specimen on said core, said end piece being separated from said core by a small non-magnetic gap, said remote end of said core being spaced sufficiently far from said specimen so that in operation the magnetic influence of variations in said specimen is substantially less on said remote end than on said adjacent end, and an electric energizing, balancing and indicating circuit including a coil wound on said core in two symmetrical spaced portions connected together at a center tap, each portion having a terminal electrically remote from said center tap, a source of alternating current effectively connected across said terminals whereby to create an alternating electromagnetic field in said core, a potentiometer connected across the terminals of said coil portions for electrically balancing said circuit, and indicating means effectively connected to said center tap and to the adjustable tap of said potentiometer for indicating the condition of balance of said circuit.

THEODOR ZUSCHLAG.